(12) United States Patent
Nakano

(10) Patent No.: US 6,198,315 B1
(45) Date of Patent: Mar. 6, 2001

(54) CURRENT DETECTION CIRCUIT

(75) Inventor: Toshiya Nakano, Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 0 days.

(21) Appl. No.: 09/313,768

(22) Filed: May 18, 1999

(30) Foreign Application Priority Data

Jan. 12, 1998 (JP) .................................................. 10-341682

(51) Int. Cl.[7] .................................................. H02P 3/00
(52) U.S. Cl. ........................... 327/110; 327/423; 327/424
(58) Field of Search ..................................... 327/110, 423, 327/424; 318/696, 685, 434, 811, 599; 363/58, 98, 132

(56) References Cited

U.S. PATENT DOCUMENTS

| | | | | |
|---|---|---|---|---|
| 5,287,046 | * | 2/1994 | Carpenter et al. | 318/293 |
| 5,428,522 | * | 6/1995 | Millner et al. | 363/63 |
| 5,444,622 | * | 8/1995 | Takeshima et al. | 364/424.05 |
| 5,471,122 | * | 11/1995 | Bilotti et al. | 318/284 |
| 5,818,180 | * | 10/1998 | Canclini | 318/254 |

FOREIGN PATENT DOCUMENTS

| | | |
|---|---|---|
| 10-51246 | 2/1998 | (JP) . |
| 10-127091 | 5/1998 | (JP) . |

\* cited by examiner

*Primary Examiner*—Tuan T. Lam
(74) *Attorney, Agent, or Firm*—Oblon, Spivak, McClelland, Maier & Neustadt, P.C.

(57) ABSTRACT

A current detection circuit having a voltage conversion section for converting current flowing to a load to a voltage; an amplifier section having an operational amplifier for amplifying the voltage converted by the voltage conversion section; a constant current circuit section having a constant current circuit connected to an input of the operational amplifier; and a current detection section for detecting a load current from a voltage amplified by the amplifier section. The constant current circuit section shifts the input offset voltage to the operational amplifier of the amplifier section. As a result, a dead zone in which a load current cannot be detected due to the input offset voltage of the operational amplifier can be eliminated.

12 Claims, 4 Drawing Sheets

CURRENT DETECTION CIRCUIT

BACKGROUND OF THE INVENTION

1. Field of the Invention

The present invention relates to a current detection circuit for detecting current flowing to a load and, more specifically, to the current detection circuit capable of eliminating a dead band in which current detection is not possible.

2. Description of Related Art

A common method of controlling the various motors used in automotive and other applications today is to monitor the current flowing to the motor for use in pulse width modulation (PWM) control. To accomplish this, the current flowing to the motor must be accurately detected for feedback to a microprocessor or other control circuit. Methods for detecting the current value include detecting a change in field strength and converting this change to a current value, and converting the potential difference at both ends of a low resistance shunt resistor to a current value. In the latter case current is monitored by converting the current flowing to the shunt resistor to a voltage, and an operational amplifier is used for this purpose.

FIG. 5 is a circuit diagram of a current detection circuit for detecting current flowing to a motor according to the related art. Note that the current detection circuit shown in FIG. 5 is described below as applied to a motor control circuit for controlling a motor by means of PWM control.

Referring to FIG. 5, this motor control circuit 100 comprises a driver circuit 101, current detection circuit 102, and control circuit 103. The driver circuit 101 comprises a plurality of power elements 101*a* to 101*d* in an H-bridge construction for driving a motor M. In FIG. 5 these power elements 101*a* to 101*d* are MOSFETs by way of example only. The current detection circuit 102 detects the current flowing to the motor M. Based on the current detected by the current detection circuit 102, the control circuit 103, which is typically a microprocessor, duty controls the MOSFETs 101*a* to 101*d* of the driver circuit 101 to achieve a specific current flowing to the motor M.

A shunt resistor 111 in the current detection circuit 102 converts current flowing to the motor M to a voltage. An operational amplifier 112, npn-type transistor 113, and resistors 114 to 116 form an amplifying circuit which amplifies the potential difference between the ends of the shunt resistor 111 and converts the potential difference to a voltage Va referenced to the ground potential. This voltage Va is then output from buffer 117 to the control circuit 103.

Based on this supplied voltage Va, the control circuit 103 duty controls the power elements of the driver circuit 101 so that the current flowing to the motor M is maintained at a set value. For example, if the control circuit 103 determines that the current flowing to the motor M is below this setting based on this voltage Va, it increases the duty cycle of the control signals to the MOSFETs 101*a* to 101*d* in a feedback control loop until the current flowing to the motor M is adjusted to the setting.

Let us assume here that MOSFETs 101*a* and 101*d* have been turned on to drive the motor M, and the load current IL flowing to the motor M thus passes from power supply terminal Vb through shunt resistor 111 and to MOSFET 101*a*, then from MOSFET 101*a* through the motor M to MOSFET 101*d* and ultimately to ground. If the resistance of resistor 114, 115, and 116 is R114, R115, and R116, respectively, at this time, the potential difference between the ends of the shunt resistor 111 is converted by the operational amplifier 112 to voltage Va with a gain of R116/R114 referenced to the ground. The voltage Va can thus be expressed in this case by the following equation (A):

$$Va = IL \times R111 \times R116/R114 \quad (A)$$

where R111 is the resistance of shunt resistor 111.

For example, if R114=R115=5 k$\Omega$, R116=100 k$\Omega$, IL=20 A, and R111=5 m$\Omega$, equation (A) above shows that Va=2 V. The voltage Va thus obtained is then output through buffer 117 to the control circuit 103.

In the motor control circuit 100 thus comprised, however, there is a dead zone in which a low load current IL cannot be detected depending upon the value of the input offset voltage of the operational amplifier 112. That is, when the resistance of the shunt resistor 111 is low and the potential difference between the ends is low, the offset voltage of the operational amplifier 112 has a relatively greater effect on operation, and the current cannot be detected even though current is flowing to the motor M. For example, if the input offset voltage Vos of the operational amplifier 112, the potential difference of the non-inverting input to the inverting input, is 10 mV, the operational amplifier 112 will not operate unless the potential difference of the shunt resistor 111 is 10 mV or greater.

When the resistance R111 of the shunt resistor 111 is 5 m$\Omega$, the potential difference of the shunt resistor 111 is 10 mV at a 2 A load current IL. The voltage Va is therefore 0 V when the load current IL is less than 2 A, the input voltage Vm to the control circuit 103 is therefore also 0 V, and the load current IL cannot be detected. The relationship between the load current IL and input voltage Vm of the control circuit 103 depends upon the input offset voltage Vos of the operational amplifier 112 as shown in FIG. 6, and when the input offset voltage Vos is in the range 0 V to 10 mV, there is a dead zone in which the load current IL cannot be detected.

Although the object and configuration differ from those of the present invention, Japanese Patent Laid-Open Publication No. 10-117112 teaches a circuit in which a non-inverting input side 31 of an operational amplifier 3 is connected to a first reference potential $P_1$, and an inverting input side 32 of the operational amplifier 3 is connected to a second reference potential $P_2$ through the constant current source of a current copying circuit 8. Likewise, Japanese Patent Laid-Open Publication No. 10-51246 teaches a circuit in which the base of a current sink transistor 18 in a low voltage operational amplifier 10 is biased by connection to a current sink 15, and a dc loop through a sink control circuit 14 and source control circuit 22 produces a base drive current bias in transistors 18 and 24.

Furthermore, although the object and configuration again differ from those of the present invention, Japanese Patent Laid-Open Publication No. 10-41759 teaches a circuit in which a bias current $I_p$ is supplied from a transistor 26 forming a current mirror circuit to the bases of transistors 12 and 13 in the power output stage 6 of an operational amplifier 1, and when biased to an AB-class state a quiescent current is controlled by a transistor 18 in gain stage 5.

Yet further, and while again the object and configuration differ from those of the present invention, Japanese Patent Laid-Open Publication No. 10-127091 teaches a circuit in which a mirror current reflecting the current of a drive transistor for driving a motor is produced in a detection transistor, and the amplitude of current flowing to the drive transistor is controlled according to the mirror current of the detection transistor. Likewise, Japanese Patent Laid-Open Publication No. 10-90312 teaches a current detection circuit

100 for supplying an output signal $I_{out}$, which is indicative of a current signal $I_d$ flowing to an FET output device 101, to an output 110 irrespective of change in the drain-source voltage $V_{DS}$ of the FET output device 101.

SUMMARY OF THE INVENTION

The present invention is therefore directed to a means for resolving the aforementioned problems by providing a current detection circuit for detecting a load current with good precision, and eliminating the dead zone in which current detection is not possible due to the input offset voltage of an operational amplifier, by connecting a constant current circuit to one input terminal of the operational amplifier and shifting the input offset voltage of the operational amplifier.

To achieve the above object, a current detection circuit according to the present invention comprises: a voltage conversion section for converting current flowing to a load to a voltage; an amplifier section having an operational amplifier for amplifying the voltage converted by the voltage conversion section; a constant current circuit section having a constant current circuit connected to one input of the operational amplifier; and a current detection section for detecting a load current from a voltage amplified by the amplifier section. In a current detection circuit thus comprised, the constant current circuit section shifts the input offset voltage to the operational amplifier of the amplifier section. As a result, the dead zone in which a load current cannot be detected due to the input offset voltage of the operational amplifier can be eliminated.

The voltage conversion section preferably comprises a resistor through which the load current flows, and the amplifier section preferably amplifies the potential difference between the ends of this resistor.

More specifically, by designing the operational amplifier to amplify the potential difference between the ends of this resistor resulting from the load current flow therethrough, and connecting the constant current circuit section to one of the input terminals of the operational amplifier, the input offset voltage of the operational amplifier can be shifted. As a result, a dead zone in which a load current cannot be detected, and which is created by the input offset voltage of the operational amplifier, can be eliminated.

In addition, the constant current circuit section of a current detection circuit according to the present invention preferably lowers the potential of one input to the operational amplifier.

If the constant current circuit section raises the potential of one input to the operational amplifier, it is still possible to eliminate a dead zone in which a load current cannot be detected, and which is created by the input offset voltage of the operational amplifier.

The current detection section can alternatively be comprised to store the input voltages input from the amplifier section for a specific load current, and then calculate the load current from the input voltage supplied from the amplifier section based on the input voltage stored for a particular load current. When thus comprised, the load current detection precision can be further improved.

BRIEF DESCRIPTION OF THE DRAWINGS

This and other objects and attainments together with a fuller understanding of the invention will become apparent and appreciated by referring to the following description and claims taken in conjunction with the accompanying drawing, in which like parts are designated by like reference numerals, and in which:

DESCRIPTION OF THE PREFERRED EMBODIMENTS

The preferred embodiments of the present invention are described below with reference to the accompanying figures.
Embodiment 1

Figure 1:
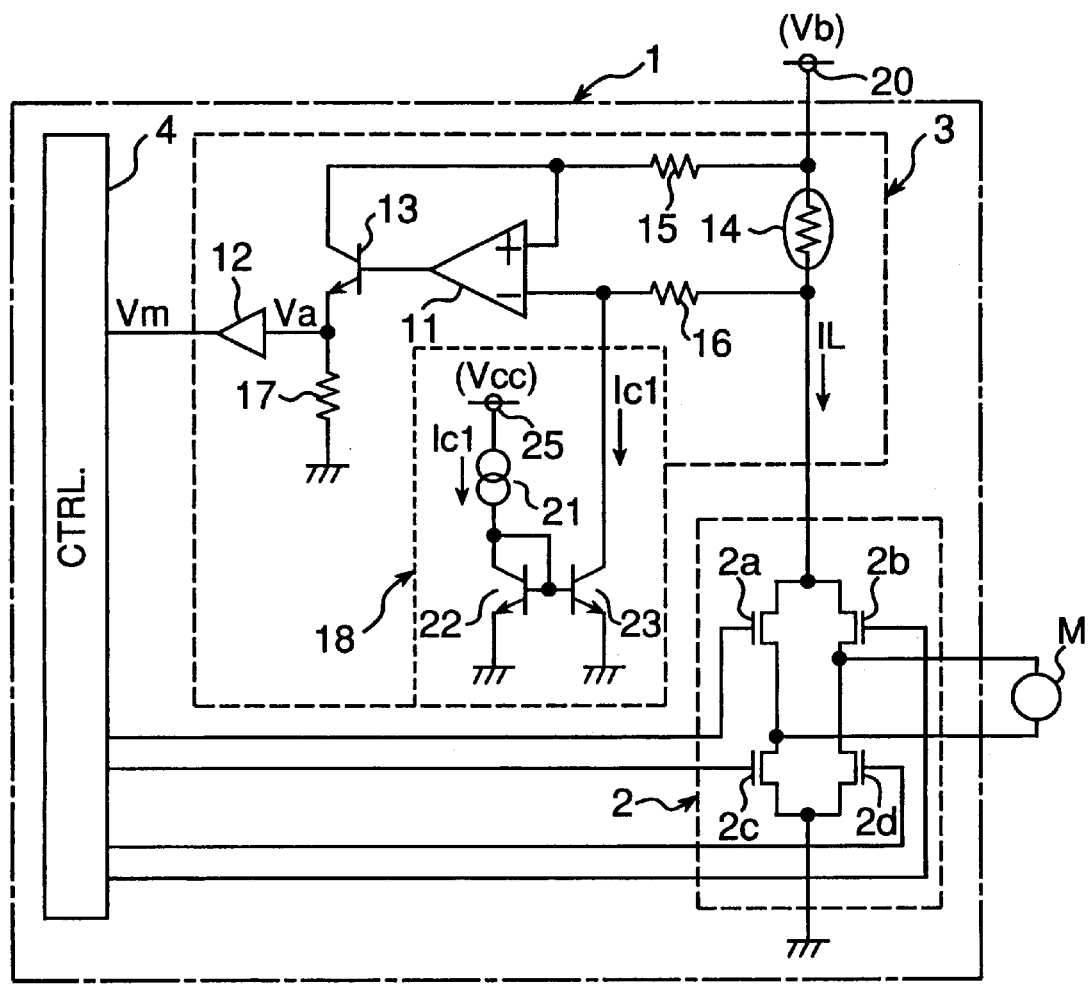
FIG. 1 is a circuit diagram of a current detection circuit according to a first preferred embodiment of the present invention.

A current detection circuit 3 according to the present invention is described in this first preferred embodiment with reference to a motor control circuit 1 as shown in FIG. 1 for controlling a motor by means of PWM control. As shown in FIG. 1, this motor control circuit 1 comprises a driver circuit 2, current detection circuit 3, and control circuit 4.

The driver circuit 2 comprises a plurality of power elements 2a to 2d, which are MOSFETs in this example, in an H-bridge construction for driving a motor M. The current detection circuit 3 detects the current flowing to the motor M. Based on the current detected by the current detection circuit 3, the control circuit 4, which is typically a microprocessor, duty controls the MOSFETs 2a to 2d of the driver circuit 2 to achieve a specific current flowing to the motor M.

In the driver circuit 2, the drains of MOSFETs 2a and 2b are connected to a common node that is connected to the current detection circuit, and the sources of MOSFETs 2c and 2d are connected to a common node that is connected to ground. The gates of MOSFETs 2a to 2d are connected to the control circuit 4. The motor M is connected to a node between the source of MOSFET 2a and the drain of MOSFET 2c, and to a node between the source of MOSFET 2b and the drain of MOSFET 2d.

The current detection circuit 3 comprises an operational amplifier 11, buffer 12, npn-type transistor 13, resistors 14 to 17, and constant current circuit 18, with resistor 14 being a shunt resistor. The shunt resistor 14 is connected between a power supply terminal 20 to which source voltage Vb is applied, and a node between the drains of MOSFET 2a and MOSFET 2b. The load current IL for driving the motor M is supplied from the power supply terminal 20, through shunt resistor 14, and to the driver circuit 2.

The non-inverting input of the operational amplifier 11 is connected through resistor 15 to a terminal on the power supply terminal 20 side of shunt resistor 14, and the inverting input is connected through resistor 16 to a terminal on the other side of the shunt resistor 14. The output of the operational amplifier 11 is connected to the base of npn-type transistor 13. The collector of npn-type transistor 13 is connected to the non-inverting input of the operational amplifier 11. The emitter of the npn-type transistor 13 is to ground through 17, and is also connected to the input of the buffer 12. The output of the buffer 12 is connected to the control circuit 4.

The constant current circuit 18 is also connected to the inverting input of the operational amplifier 11. The constant current circuit 18 comprises constant current source 21, and npn-type transistors 22 and 23. The npn-type transistors 22 and 23 form a current emitter circuit. The bases of the npn-type transistors 22 and 23 in the constant current circuit 18 are connected to a common node, and the emitters are to ground. The collector of npn-type transistor 23 is connected to the inverting input of the operational amplifier 11. The collector of npn-type transistor 22 is connected to the base thereof, and the constant current source 21 is connected between this collector-base node and power supply terminal 25; supply voltage Vcc is applied to the power supply terminal 25.

A current detection circuit 3 thus comprised converts a load current IL flowing to the motor M to a voltage by means of shunt resistor 14, amplifies the potential difference at the ends of the shunt resistor 14 by means of an amplifying circuit formed by the operational amplifier 11, npn-type transistor 13, and resistors 15 to 17, and converts this amplified potential difference to a voltage Va based on the ground potential. This voltage Va is input from the buffer 12 to the control circuit 4 as input voltage Vm. Because of the high impedance of resistor 17, the buffer 12 also works to prevent deviation in the input voltage Vm passed to the control circuit 4, and the gain thereof is thus 1.

For example, if MOSFETs 2a and 2d are turned on to drive the motor M, the load current IL flowing to the motor M flows in the following sequence: power supply terminal 20, shunt resistor 14, MOSFET 2a, motor M, MOSFET 2d, ground, and input voltage Vm indicating the value of load current IL is input to the control circuit 4. The control circuit 4 then duty controls the MOSFETs 2a to 2d of the driver circuit 2 based on the input voltage Vm so that the current flowing to the motor M is controlled to a particular setting.

The control circuit 4 thus duty controls the MOSFETs 2a to 2d so that MOSFETs 2a and 2d are both simultaneously on, or MOSFETs 2b and 2c are both simultaneously on. Even more specifically, when the control circuit 4 determines from the input voltage Vm that the current flowing to the motor M is below a particular setting, it increases the duty of the control signals to the MOSFETs 2a to 2d in a feedback control loop until the current flowing to the motor M reaches the desired setting.

The emitter size and characteristics of both npn-type transistors 22 and 23 in the constant current circuit 18 are the same, and current equal to the constant current Ic1 supplied from the constant current source 21 flows to the collector of npn-type transistor 23. As a result, when the constant current Ic1 is set to 2 µA and the resistance R16 of resistor 16 is 5 kΩ, for example, there is a voltage drop from the source voltage Vb of Ic1×R16=10 mV in the potential of the inverting input of operational amplifier 11.

If we assume that the input offset voltage Vos of the operational amplifier 11 is 0 V, the operational amplifier 11 operates to keeps the potential of the non-inverting input equal to the potential of the inverting input. The input voltage Vm of the control circuit 4 can therefore be obtained by the following equation (1) even when the load current IL=0 A.

$$Vm = Ic1 \times R16/R15 \times R17 \quad (1)$$

where R15 is the resistance of resistor 15, and R17 is the resistance of resistor 17. For example, if R15 and R16 are both 5 kΩ, R17 is 100 kΩ, and Ic1 is 2 µA, the input voltage Vm will be 200 mV.

Next, let us assume that the input offset voltage Vos of the operational amplifier 11 is +10 mV when the voltage from the inverting input to the non-inverting input is considered. In this case, however, the input offset voltage Vos of the operational amplifier 11 is effectively cancelled because the potential of the inverting input of operational amplifier 11 drops 10 mV due to the voltage drop of resistor 16 induced by the constant current circuit 18. As a result, when the load current IL=0 A, the input voltage Vm is also 0 V.

Figure 2:
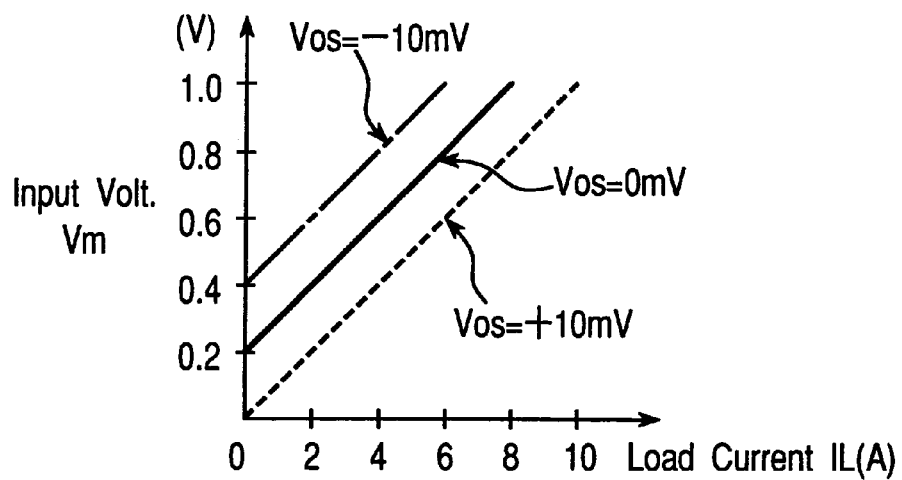
FIG. 2 is a graph showing the relationship between load current and input voltage in the current detection circuit shown in FIG. 1.

FIG. 2 is a graph showing the relationship between the input voltage Vm and load current IL in the current detection circuit shown in FIG. 1 with the input offset voltage Vos reflecting the voltage difference from the inverting input to the non-inverting input. As will be known from FIG. 2, when the input offset voltage Vos of the operational amplifier 11 is +10 mV, the input voltage Vm is 0 A when the load current IL is 0 A. When the load current IL rises from 0 A, the +10-mV input offset voltage Vos is cancelled by the constant current circuit 18, and the input voltage Vm therefore rises relative to the rise in the load current IL from 0 A.

The operation of the control circuit 4 is described in further detail below. As will be known from FIG. 2, the voltage conversion circuit 3 can eliminate the dead zone in which the load current IL cannot be detected, but canot eliminate variation in the input offset voltage Vos of the operational amplifier 11. The control circuit 4 is therefore preferably so designed as to store the input voltage Vm and load current IL values at a specific load current IL flow, and calculate a load current for a given input voltage Vm based on these stored values.

The input voltage Vm to the control circuit 4 can be derived from the following equation (2):

$$Vm = \{R14 \times IL - (Vos - Ic1 \times R16)\} \times R17/R15 \quad (2)$$
$$= (R17 \times R14/R15) \times IL - (R17/R15) \times (Vos - Ic1 \times R16)$$

where R14 is the resistance of shunt resistor 14.

From equation (2) we know that the slope of the IL-Vm characteristic is determined by (R17×R14/R15), and the intercept changes with the input offset voltage Vos. It is therefore possible to supply a specific load current IL, and determine the IL-Vm characteristic from the value of input voltage Vm at that time.

The control circuit 4 is therefore set to an initial check mode in which the MOSFETs 2a to 2d of the driver circuit 2 are controlled to supply a load current IL of a constant Iconst (where Iconst is between zero and several amps) to the motor M. The input voltage Vm obtained at each Iconst is then stored to flash memory or other storage means (not shown in the figures). Because the input voltage Vm and load current IL are proportional to the slope of equation (2), the control circuit 4 can determine that a stored input voltage Vm corresponds to load current IL=Iconst, and based on this can calculate the value of load current IL for a particular input voltage Vm.

Figure 3:
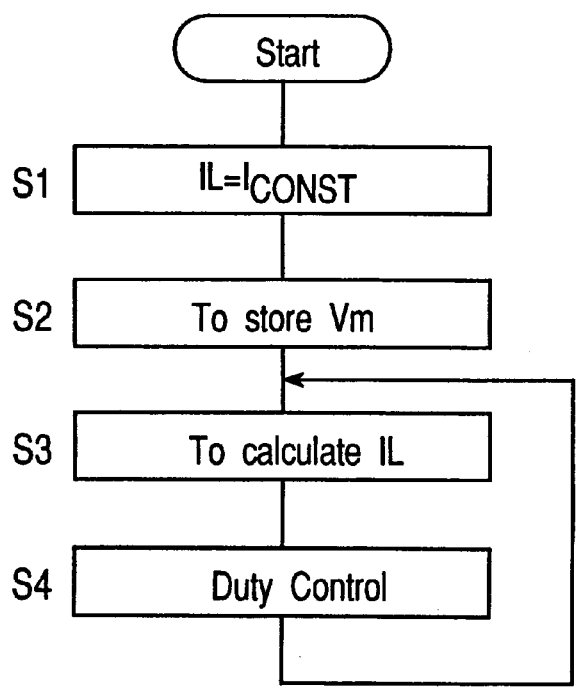
FIG. 3 is a flow chart used to describe the operation of the control circuit 4 shown in FIG. 1.

FIG. 3 is a flow chart of an exemplary operation of control circuit 4 as described below.

At step S1, the control circuit 4 outputs control signals to the MOSFETs 2a to 2d of the driver circuit 2 so that a load current IL of a predetermined Iconst flows. In step S2, stores the input voltage Vm obtained for the load current Iconst so that the relationship between input voltage Vm and load current Iconst is known. This completes the initial check mode. Next, in step S3, the control circuit 4 reads an input voltage Vm, and calculates the value of load current IL for that input voltage Vm based on the stored data. In step S4, the control circuit 4 duty controls the MOSFETs 2a to 2d of the driver circuit 2 so that the calculated load current IL is controlled to a desired value, and then loops back to step S3. The control circuit 4 thus controls the current flowing to the motor M.

Embodiment 2

Figure 4:
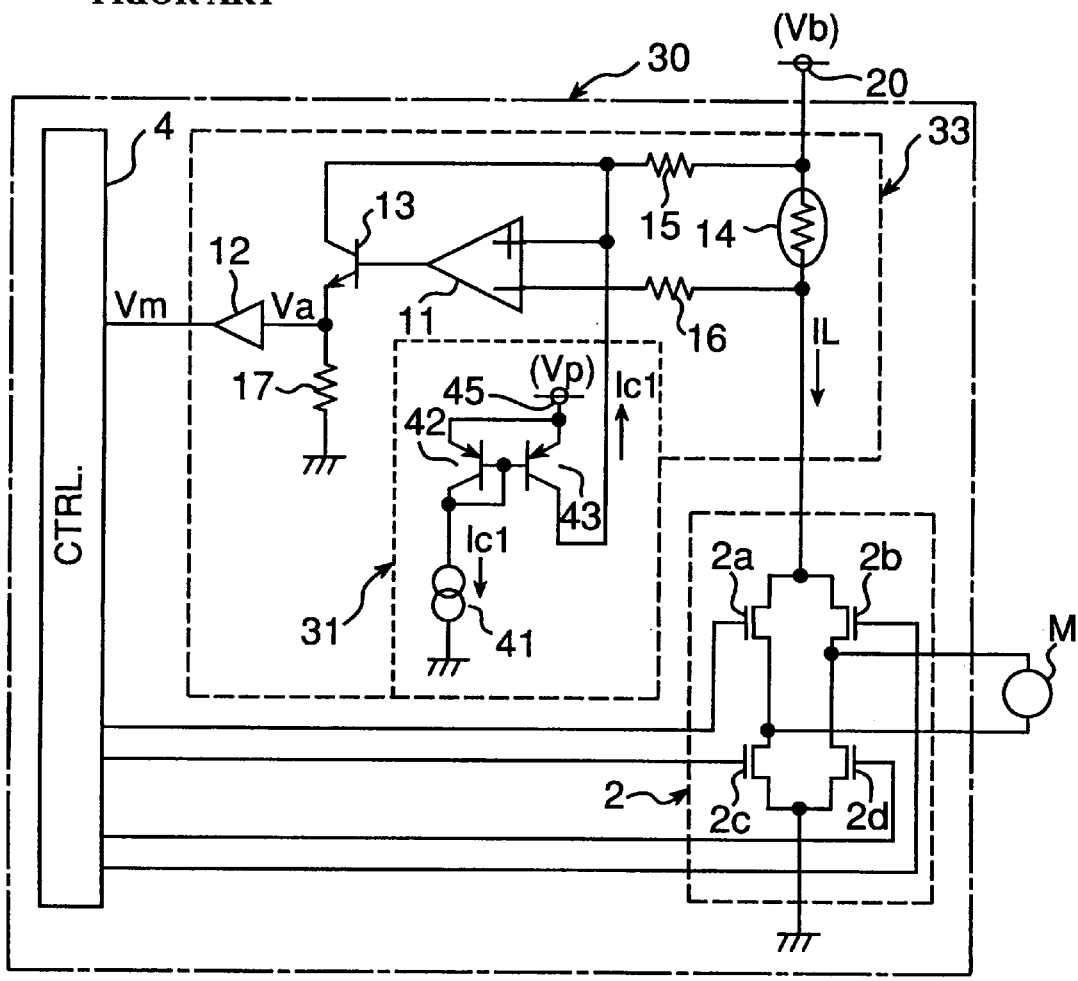
FIG. 4 is a circuit diagram of a current detection circuit according to a second preferred embodiment of the present invention.
Figure 5:
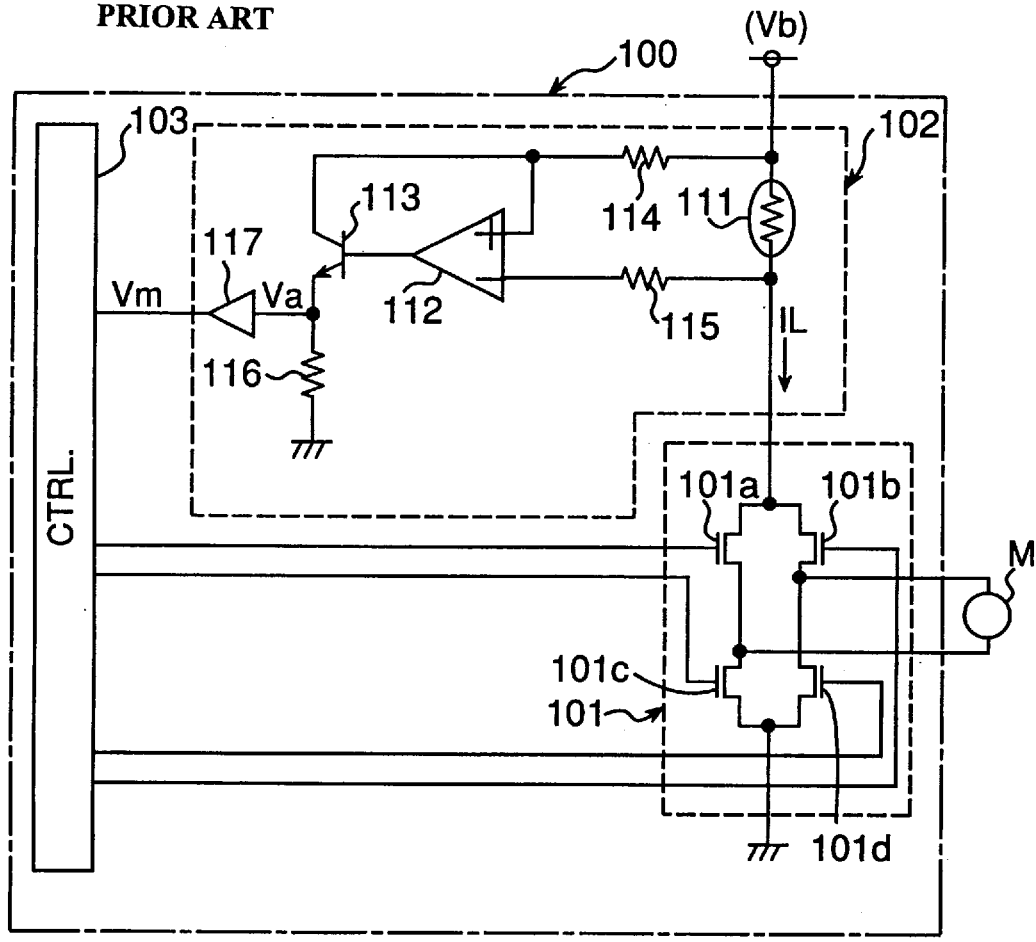
FIG. 5 is a circuit diagram of a current detection circuit according to the related art for detecting current flowing to a motor.
Figure 6:
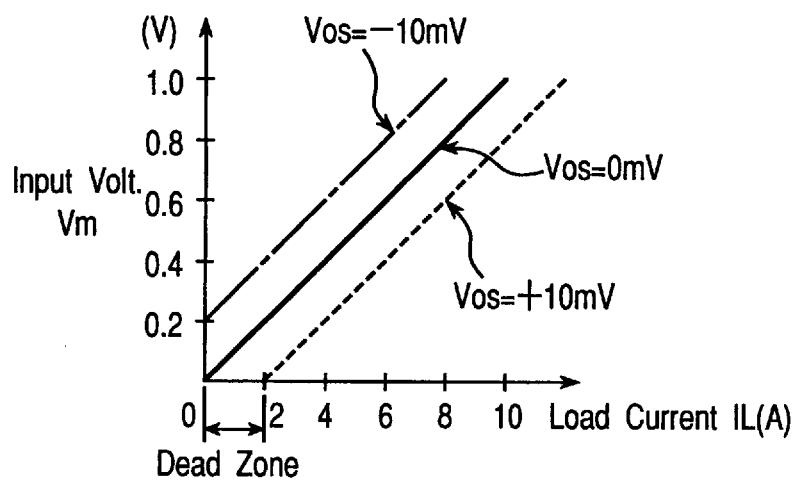
FIG. 6 is a graph showing the relationship between load current and input voltage in the current detection circuit shown in FIG. 5.

FIG. 4 is a circuit diagram of a current detection circuit according to a second preferred embodiment of the present invention. Note that in this embodiment the constant current circuit is connected to the non-inverting input of the operational amplifier 11. Note, further, that a current detection circuit 33 according to this preferred embodiment is also described with reference to a motor control circuit 30 as shown in FIG. 4 for controlling a motor by means of PWM control.

As noted above, a current detection circuit according to this second embodiment differs from that shown in FIG. 1 in that the constant current circuit 18 in FIG. 1 is replaced by a constant current circuit 31 connected to the non-inverting input of the operational amplifier 11. The current detection circuit 3 in FIG. 1 is therefore referred to below as current detection circuit 33, and the motor control circuit 1 in FIG. 1 as motor control circuit 30.

As shown in FIG. 4, this motor control circuit 30 comprises a driver circuit 2, current detection circuit 33 for detecting current flowing to a motor M, and control circuit 4. This control circuit 4 duty controls the MOSFETs 2a to 2d of the driver circuit 2 to achieve a specific current flowing to the motor M based on the current value detected by the current detection circuit 33.

The current detection circuit 33 comprises an operational amplifier 11, buffer 12, npn-type transistor 13, resistors 14 to 17, and constant current circuit 31. The constant current circuit 31 is connected to the non-inverting input of the operational amplifier 11, and comprises: constant current source 41, and pnp transistors 42 and 43. The pnp-type transistors 42 and 43 form a current emitter circuit. The bases of the pnp-type transistors 42 and 43 in the constant current circuit 31 are connected to a common node, and the emitters are connected to a step-up voltage terminal 45.

The collector of pnp-type transistor 43 is connected to the non-inverting input of the operational amplifier 11. The base and collector of the pnp transistor 42 are connected to a common node, and the constant current source 41 is connected between this node and ground. A step-up voltage source is used as the power supply of the constant current circuit 31 because it is necessary to bias the constant current source 41 a few tenths of a volt, and a stepped up voltage higher than the source voltage Vb is therefore preferred for the constant current circuit 31.

The emitter size and characteristics of both pnp-type transistors 42 and 43 in the constant current circuit 31 are the same, and current equal to the constant current Ic supplied from the constant current source 41 flows to the collector of pnp-type transistor 43. As a result, when the current flowing to resistor 15 decreases by constant current Ic1. If the constant current Ic1 is set to 2 μA and the resistance R15 of resistor 15 is 5 kΩ, for example, there is a voltage drop from the source voltage Vb of Ic1×R15=10 mV in the potential of the non-inverting input of operational amplifier 11.

If the input offset voltage Vos of the operational amplifier 11 is +10 mV when the voltage from the inverting input to the non-inverting input is considered, the input offset voltage Vos of the operational amplifier 11 is effectively cancelled by the constant current circuit 31 with the same effect as described in the first embodiment above.

As will be known from the above, a current detection circuit according to the first embodiment of the present invention shifts the input offset voltage Vos of the operational amplifier 11 by connecting a constant current circuit to either of the input terminals to the operational amplifier 11, which amplifies the potential difference between the ends of the shunt resistor 14 resulting from the load current IL flow. As a result, the dead zone in which a load current cannot be detected, and which results from the input offset voltage of the operational amplifier, can be eliminated.

Furthermore, in an initial check mode the control circuit 4 stores the input voltage Vm obtained at a particular load current Iconst when a load current IL of this specific constant current Iconst is supplied to the motor M. During current detection operation, the control circuit 4 then calculates the load current when a particular input voltage Vm is detected based on the stored input voltage Vm values. As a result, the load current detection precision can be improved.

It should be noted that the power supply of the operational amplifier 11 and the power supply for the control circuit 4 and buffer 12 need not be the same. For example, when used in an automobile, the source voltage Vb is 12 VDC, and the operational amplifier 11 operates with this source voltage Vb, but the control circuit 4 and buffer 12 can be driven with a 5 VDC supply. While the gain of the buffer 12 is 1 in the first embodiment above, in this case the buffer 12 is increased and the gain of the operational amplifier 11 is decreased a corresponding amount to improve the load current IL detection precision. This is because the input offset voltage Vos of the operational amplifier 11 is dependent upon the supply voltage, and current detection precision can be improved by decreasing the operational amplifier 11 gain and increasing the buffer 12 gain to obtain the same total gain.

Furthermore, the input offset voltage Vos of the operational amplifier 11 is adjusted externally to the operational amplifier 11 in the first embodiment of the invention above. However, if circuits shown in FIG. 1 and FIG. 3 are achieved in an application-specific IC for a particular customer, the input offset voltage Vos of the operational amplifier 11 can be purposely designed at the time of manufacture to occur only on the inverting input side, and still achieve the same benefits described in the above first embodiment.

Although the present invention has been described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims, unless they depart therefrom.

What is claimed is:

1. A load current value determining circuit, comprising:
   a voltage conversion section connected to receive and pass load current to a load and to provide a converted voltage indicative of a load current value;
   an amplifier section having an operational amplifier connected to receive and amplify the converted voltage from the voltage conversion section;
   a constant current circuit section having a constant current circuit including transistors connected to an input of the operational amplifier; and
   a current determining section configured to determine said load current value from an input voltage received from the amplifier section;
   wherein the constant current circuit section is configured to cause a shift in an input offset voltage to the operational amplifier of the amplifier section.

2. The current determining circuit according to claim 1, wherein the voltage conversion section comprises a resistor through which the load current flows, and the converted voltage corresponds to a potential difference between the ends of said resistor.

3. The current determining circuit according to claim 1, wherein the constant current circuit section lowers the potential of said input to the operational amplifier.

4. The current determining circuit according to claim 2, wherein the constant current circuit section lowers the potential of said input to the operational amplifier.

5. The current determining circuit according to claim 1, wherein the constant current circuit section raises the potential of one input to the operational amplifier.

6. The current determining circuit according to claim 2, wherein the constant current circuit section raises the potential of said input to the operational amplifier.

7. The current determining circuit according to claim 1, wherein the current determining section includes a store having specific input voltage values stored therein derived from the operational amplifier under conditions of operating with specific values of load current and the current determining section determines said load current value based upon the input voltage from the operational amplifier and the stored specific input voltage values.

8. The current determining circuit according to claim 2, wherein the current determining section includes a store having specific input voltage values stored therein derived from the operational amplifier under conditions of operating with specific values of load current and the current determining section determines said load current value based upon the input voltage from the operational amplifier and the stored specific input voltage values.

9. The current determining circuit according to claim 3, wherein the current determining section includes a store having specific input voltage values stored therein derived from the operational amplifier under conditions of operating with specific values of load current and the current determining section determines said load current value based upon the input voltage from the operational amplifier and the stored specific input voltage values.

10. The current determining circuit according to claim 4, wherein the current determining section includes a store having specific input voltage values stored therein derived from the operational amplifier under conditions of operating with specific values of load current and the current determining section determines said load current value based upon the input voltage from the operational amplifier and the stored specific input voltage values.

11. The current determining circuit according to claim 5, wherein the current determining section includes a store having specific input voltage values stored therein derived from the operational amplifier under conditions of operating with specific values of load current and the current determining section determines said load current value based upon the input voltage from the operational amplifier and the stored specific input voltage values.

12. The current determining circuit according to claim 6, wherein the current determining section includes a store having specific input voltage values stored therein derived from the operational amplifier under conditions of operating with specific values of load current and the current determining section determines said load current value based upon the input voltage from the operational amplifier and the stored specific input voltage values.

* * * * *

UNITED STATES PATENT AND TRADEMARK OFFICE
CERTIFICATE OF CORRECTION

| | |
|---|---|
| PATENT NO. : 6,198,315 B1 | Page 1 of 1 |
| DATED : March 6, 2001 | |
| INVENTOR(S) : Nakano | |

It is certified that error appears in the above-identified patent and that said Letters Patent is hereby corrected as shown below:

<u>Title page,</u>
Item (30), the Foreign Priority information is incorrect. Item (30) should read:

-- (30) Foreign Application Priority Data

Dec. 1, 1998      [JP]............................10-341682 --

Signed and Sealed this

Twenty-fifth Day of September, 2001

Attest:

NICHOLAS P. GODICI
*Attesting Officer*     *Acting Director of the United States Patent and Trademark Office*